(12) United States Patent
Silverio

(10) Patent No.: US 11,465,769 B2
(45) Date of Patent: Oct. 11, 2022

(54) ELECTRIC AIRCRAFT HAVING RAM AIR TURBINES

(71) Applicant: Yandriel Silverio, Rockford, IL (US)

(72) Inventor: Yandriel Silverio, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 534 days.

(21) Appl. No.: 15/868,847

(22) Filed: Jan. 11, 2018

(65) Prior Publication Data
US 2019/0210739 A1 Jul. 11, 2019

(51) Int. Cl.
| | | |
|---|---|---|
| B64D 41/00 | (2006.01) | |
| B64D 31/06 | (2006.01) | |
| B64D 31/04 | (2006.01) | |
| B64D 27/24 | (2006.01) | |

(52) U.S. Cl.
CPC ........... *B64D 41/007* (2013.01); *B64D 27/24* (2013.01); *B64D 31/04* (2013.01); *B64D 31/06* (2013.01)

(58) Field of Classification Search
CPC ....... B64D 41/007; B64D 31/06; B64D 31/04
See application file for complete search history.

(56) References Cited

U.S. PATENT DOCUMENTS

| | | | | |
|---|---|---|---|---|
| 5,820,074 A | * | 10/1998 | Trommer ............. | B64D 41/007 244/58 |
| 9,083,201 B2 | * | 7/2015 | Bauer ...................... | H02J 9/08 |
| 9,573,697 B2 | | 2/2017 | Criado et al. | |
| 2005/0067533 A1 | * | 3/2005 | Lukavec ................ | B64D 17/56 244/149 |
| 2009/0121077 A1 | * | 5/2009 | Lynas ..................... | B64C 25/44 244/58 |
| 2009/0292407 A1 | * | 11/2009 | Minelli ................... | B64C 27/26 701/3 |
| 2011/0229309 A1 | * | 9/2011 | Russ ....................... | F01D 25/28 415/126 |
| 2011/0315815 A1 | * | 12/2011 | Finney ................. | B64D 41/007 244/58 |
| 2012/0056601 A1 | * | 3/2012 | Spierling ............... | B64D 15/12 322/34 |
| 2014/0050582 A1 | * | 2/2014 | Larson, Jr. ........... | B64D 41/007 416/95 |
| 2016/0031567 A1 | | 2/2016 | Roques | |
| 2018/0050813 A1 | * | 2/2018 | Larson, Jr. ........... | B64D 41/007 |
| 2018/0291807 A1 | * | 10/2018 | Dalal ....................... | F02C 6/20 |
| 2018/0363626 A1 | * | 12/2018 | Baines .................. | F03D 7/0224 |

FOREIGN PATENT DOCUMENTS

GB 987032 A * 3/1965 ........... B64D 41/007

* cited by examiner

*Primary Examiner* — Richard R. Green
*Assistant Examiner* — Arfan Y. Sinaki
(74) *Attorney, Agent, or Firm* — Locke Lord LLP; Daniel J. Fiorello; Gabrielle Gelozin

(57) ABSTRACT

In accordance with at least one aspect of this disclosure, an electric aircraft can include an electrical accumulator, an electric propulsion system operatively connected to the electrical accumulator and configured to convert electrical energy into propulsive force, and a ram air turbine (RAT) operatively connected to the electrical accumulator to store energy. The RAT can be selectively deployable between a stowed position wherein the RAT is not exposed to ram air and a deployed position wherein the RAT is exposed to ram air to store energy in the electrical accumulator.

14 Claims, 1 Drawing Sheet

ELECTRIC AIRCRAFT HAVING RAM AIR TURBINES

BACKGROUND

1. Field

The present disclosure relates to electric aircraft, more specifically to electric aircraft having ram air turbines.

2. Description of Related Art

Currently in the industry when an aircraft lands, all of the potential energy that was built up is wasted. There is no means in traditional aircraft to harvest such potential energy if desired.

Such conventional methods and systems have generally been considered satisfactory for their intended purpose. However, there is still a need in the art for improved aircraft systems. The present disclosure provides a solution for this need.

SUMMARY

In accordance with at least one aspect of this disclosure, an electric aircraft can include an electrical accumulator, an electric propulsion system operatively connected to the electrical accumulator and configured to convert electrical energy into propulsive force, and a ram air turbine (RAT) operatively connected to the electrical accumulator and configured to provide energy to the electrical accumulator when exposed to and driven by ram air, wherein the RAT is selectively deployable between a stowed position wherein the RAT is not exposed to ram air and a deployed position wherein the RAT is exposed to ram air.

The aircraft can further include a controller configured to control the position of the RAT between the stowed position and the deployed position. The controller can be configured to move the RAT to the deployed position in response to one or more occurrences.

The one or more occurrences can include at least one of receiving a manual activation signal from a manual control, exceeding a vertical speed threshold, a power setting below a power setting threshold, a flaps setting threshold, an altitude below an altitude threshold or within a threshold range, or an aircraft position within a position threshold of a waypoint or airport. In certain embodiment, the controller can be a full authority digital engine controller (FADEC) as appreciated by those having ordinary skill in the art.

A system for an electric aircraft can include a ram air turbine (RAT) configured to be operatively connected to an electrical accumulator to store the energy, wherein the RAT is selectively deployable between a stowed position wherein the RAT is not exposed to ram air and a deployed position wherein the RAT is exposed to ram air to store energy in the electrical accumulator, and a controller configured to control the position of the RAT between the stowed position and the deployed position in response to one or more occurrences, as described above.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
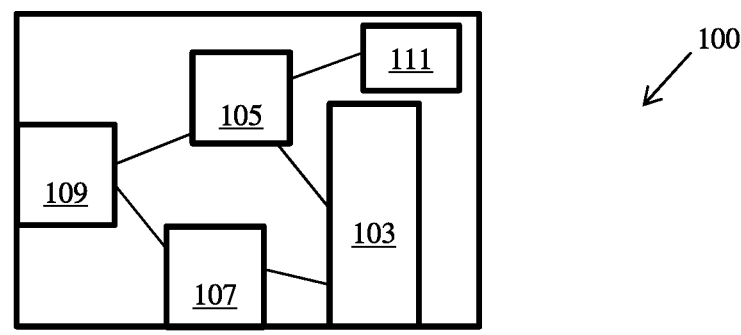
FIG. 1 is a schematic view of an embodiment of a portion of an aircraft having an embodiment of a system disposed on an aircraft in accordance with this disclosure, showing a ram air turbine (RAT) in a stowed position.

Reference will now be made to the drawings wherein like reference numerals identify similar structural features or aspects of the subject disclosure. For purposes of explanation and illustration, and not limitation, an illustrative view of an embodiment of an aircraft in accordance with the disclosure is shown in FIG. 1 and is designated generally by reference character 100. Other embodiments and/or aspects of this disclosure are shown in FIGS. 2.

Figure 2:
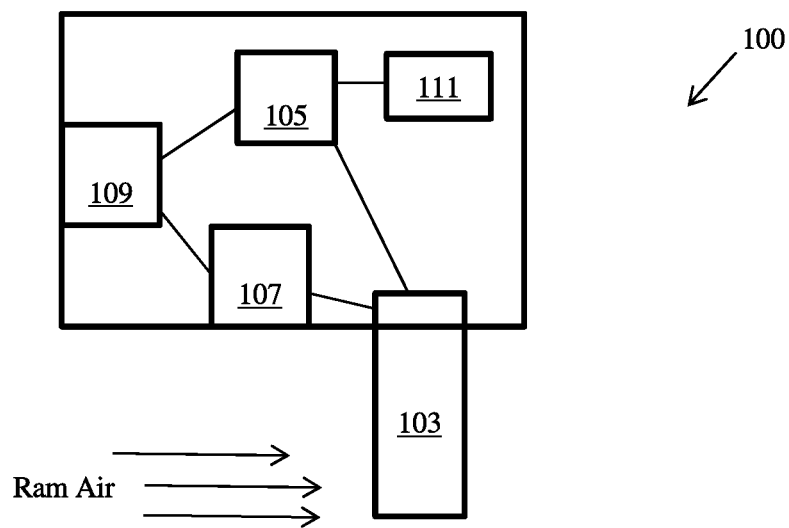
FIG. 2 is a schematic of the embodiment of FIG. 1, showing the RAT in a deployed position.

In accordance with at least one aspect of this disclosure, referring to FIGS. 1 and 2, an electric aircraft 100 can include an electrical accumulator 107 (e.g., a battery) and an electric propulsion system 109 operatively connected to the electrical accumulator 107 and configured to convert electrical energy into propulsive force. The electrical accumulator 107 can include any suitable number of electrical accumulators (e.g., batteries and/or cells thereof) and/or energy management systems, e.g., a battery management system (BMS). The electric propulsion system 109 can include any suitable propulsion system (e.g., an e-fan, an electric motor connected to a traditional propeller).

The aircraft 100 includes a ram air turbine (RAT) 103 operatively connected to the electrical accumulator 107 and configured to provide energy to the electrical accumulator 107 when exposed to and driven by ram air. The RAT 103 can be selectively deployable between a stowed position (e.g., as shown in FIG. 1) wherein the RAT 103 is not exposed to ram air and a deployed position (e.g., as shown in FIG. 2) wherein the RAT 103 is exposed to ram air. The RAT 103 can be connected to the aircraft and moveable in any suitable manner (e.g., rotatable from airframe to the deployed position, or linearly deployable outward from the airframe, or any other suitable way).

The aircraft 100 can further include a controller 105 configured to control the position of the RAT 103 between the stowed position and the deployed position. The controller 105 can include any suitable computer hardware modules and/or software modules as appreciated by those having ordinary skill in the art to carry out the described function of the controller 105. One or more components of the controller 105 can be integrated into any suitable aircraft computer and/or can be physically separate from an aircraft computer. In certain embodiment, the controller 105 can be a full authority digital engine controller (FADEC) as appreciated by those having ordinary skill in the art.

The controller 105 can be configured to move the RAT 103 toward the deployed position in response to one or more occurrences. The one or more occurrences can include at least one of receiving a manual activation signal from a manual control (e.g., a physical or digital button in the cockpit that the pilot can activate), exceeding a vertical speed threshold (e.g., descending at 500 feet per minute or more), a power setting below a power setting threshold (e.g., idle power setting), a flaps setting at or above a flaps setting threshold (e.g., at full flaps setting), an altitude below an altitude threshold (e.g., at or below pattern altitude of about 1000 feet AGL upon landing) or within a threshold range (e.g., at or below pattern altitude of about 1000 feet AGL, but above about 300 feet AGL), or an aircraft position within a position threshold of a waypoint or airport (e.g., within a pattern distance of an airport).

The controller 105 can be configured to move the RAT 103 toward the stowed position in response to one or more stow occurrences. The one or more occurrences can include at least one of receiving a manual activation signal from a manual control to raise the RAT 103 (e.g., a physical or digital button in the cockpit that the pilot can activate), reducing descent rate below a vertical speed threshold (e.g., descending at a rate of less than 500 feet per minute, or climbing, or level flight), a power setting above the power setting threshold (e.g., above an idle power setting, or at a climb or cruise power setting), a flaps setting below the flaps setting threshold (e.g., less than full flaps, no flaps), an altitude above an altitude threshold (e.g., at or above pattern altitude of about 1000 feet AGL) or within a threshold range (e.g., above a pattern altitude of about 1000 feet AGL and below about 300 feet AGL), or an aircraft position outside of a position threshold of a waypoint or airport (e.g., outside of a pattern distance of an airport). The controller 105 can be configured to move the RAT 103 toward the stowed position within a threshold airspeed (e.g., close to stall speed to reduce stall speed).

In certain embodiments, the controller 105 can be operatively connected to any suitable aircraft system(s) (e.g., flap, throttle, engine controller, navigational systems, airspeed systems, vertical speed systems, etc.) and/or any suitable sensor(s) 111 attached thereto/associated therewith to receive any suitable data and/or analog signals to determine that the one or more occurrences have occurred.

It is contemplated that the controller 105 can be configured to allow user settings and preferences that can control occurrence thresholds. For example, the controller 105 may include a suitable user interface to allow a pilot to manually set at what altitude and/or speed range(s) deployment of the RAT 103 is allowed. The controller 105 can allow setting of any other occurrence threshold (e.g., vertical speed, position, etc.) as appreciated by those having ordinary skill in the art in view of this disclosure.

A system for an electric aircraft can include a ram air turbine (RAT) 103 configured to be operatively connected to an electrical accumulator 107 to store energy in the electrical accumulator, wherein the RAT 103 is selectively deployable between a stowed position wherein the RAT 103 is not exposed to ram air and a deployed position wherein the RAT 103 is exposed to ram air to store energy in the electrical accumulator. The system includes a controller 105 configured to control the position of the RAT between the stowed position and the deployed position in response to one or more occurrences, as described above.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Any suitable combination(s) of any disclosed embodiments and/or any suitable portion(s) thereof is contemplated therein as appreciated by those having ordinary skill in the art.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Certain embodiments deploy the RAT 103 from an electric aircraft 100, e.g., when the aircraft is preparing to land or on descent phase of flight. The RAT 103 then harvests energy and store it in the electrical accumulator. Embodiments allow more range/endurance by storing energy in the electrical accumulator using the aircrafts potential energy.

Currently in the industry, when an aircraft lands, all of the potential energy that was build up is wasted. The RAT in existing systems is only deployed for emergencies. By deploying the RAT before the aircraft lowers in altitude (e.g., on descent in preparation for landing) the potential energy that is built up can be converted into electrical power, this can be stored in the electrical accumulator as potential energy for future usage. Embodiments allow for a more efficient electric aircraft. Embodiments can also be used in emergencies as in traditional RAT systems. Embodiments can be adapted to solar panel systems for certain electric aircrafts.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:
1. An electric aircraft, comprising:
   an electrical accumulator;
   an electric propulsion system operatively connected to the electrical accumulator and configured to convert electrical energy into propulsive force;
   a ram air turbine (RAT) operatively connected to the electrical accumulator and configured to provide energy to the electrical accumulator when exposed to and driven by ram air, and
   a controller configured to control the position of the RAT between both a stowed position and a deployed position, wherein the RAT is selectively stowable and deployable between the stowed position wherein the RAT is not exposed to ram air and the deployed position wherein the RAT is exposed to ram air, wherein the controller is configured to move the RAT from the deployed position to the stowed position in response to one or more occurrences, wherein the one or more occurrences include reducing descent rate below a vertical speed threshold.

2. The aircraft of claim 1, wherein the controller is configured to move the RAT to the deployed position in response to one or more occurrences.

3. The aircraft of claim 2, wherein the one or more occurrences include receiving a manual activation signal from a manual control.

4. The aircraft of claim 2, wherein the one or more occurrences include a power setting above a power setting threshold.

5. The aircraft of claim 2, wherein the one or more occurrences include a flaps setting below a flaps setting threshold.

6. The aircraft of claim 2, wherein the one or more occurrences include an altitude above an altitude threshold or within a threshold range.

7. The aircraft of claim 2, wherein the one or more occurrences include an aircraft position outside a position threshold of a waypoint or an airport.

8. The aircraft of claim 2, wherein the controller is a full authority digital engine controller (FADEC).

9. A system for an electric aircraft, comprising:
   a ram air turbine (RAT) configured to be operatively connected to an electrical accumulator to store energy, wherein the RAT is selectively stowable and deployable between a stowed position wherein the RAT is not exposed to ram air and a deployed position wherein the RAT is exposed to ram air to store energy in the electrical accumulator; and
   a controller configured to control a position of the RAT between both the stowed position and the deployed position in response to one or more occurrences, wherein the controller is configured to move the RAT from the deployed position to the stowed position, wherein the one or more occurrences include reducing descent rate below a vertical speed threshold.

10. The system of claim 9, wherein the one or more occurrences include receiving a manual activation signal from a manual control.

11. The system of claim 9, wherein the one or more occurrences include a power setting above a power setting threshold.

12. The system of claim 9, wherein the one or more occurrences include a flaps setting below a flaps setting threshold.

13. The system of claim 9, wherein the one or more occurrences include an altitude above an altitude threshold or within a threshold range.

14. The system of claim 9, wherein the one or more occurrences include an aircraft position outside of a position threshold of a waypoint or an airport.

\* \* \* \* \*